Dec. 31, 1929.          J. L. ROLLINS          1,742,049
                          DIMMER GLASS
                       Filed Dec. 28, 1925
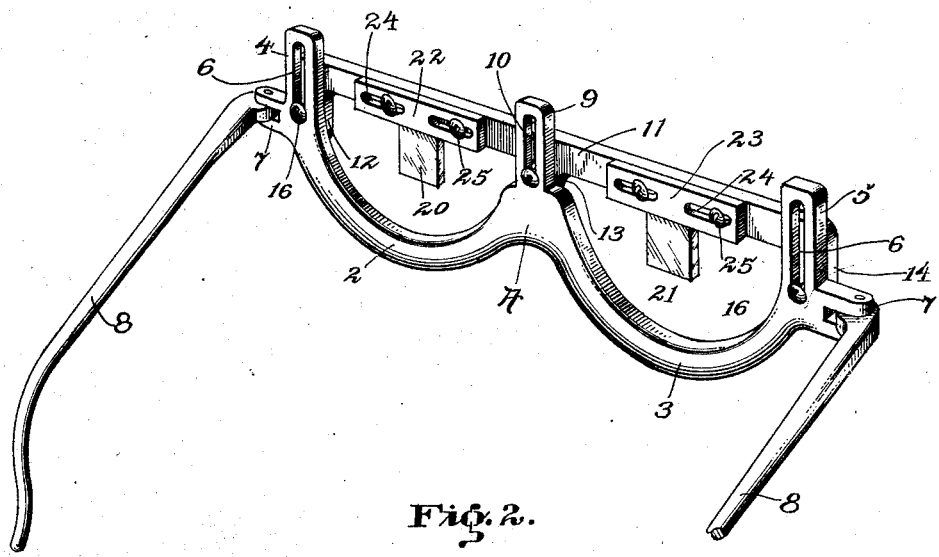
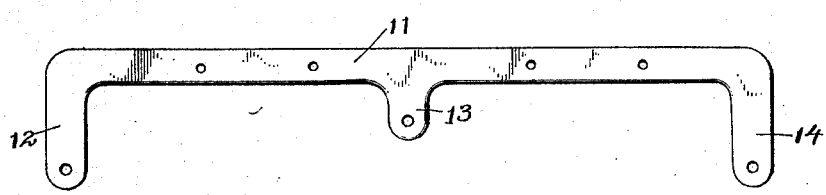
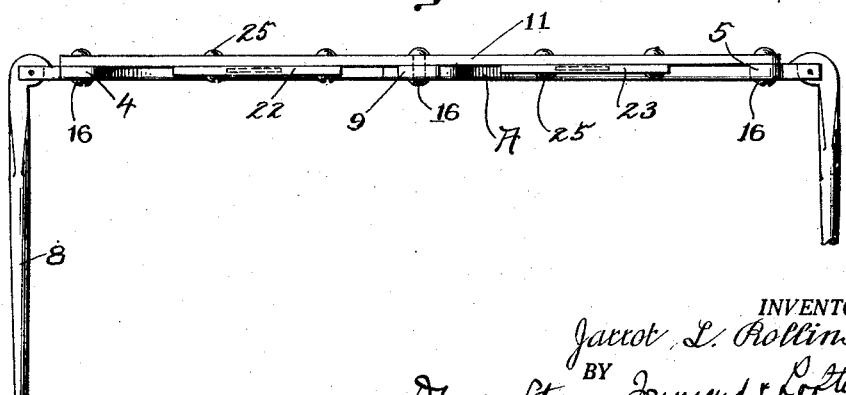
INVENTOR.
Jarrot L. Rollins
BY
Dewey, Strong, Townsend & Loftus
ATTORNEYS.

Patented Dec. 31, 1929

1,742,049

UNITED STATES PATENT OFFICE

JARROT L. ROLLINS, OF COLFAX, CALIFORNIA

DIMMER GLASS

Application filed December 28, 1925. Serial No. 78,023.

This invention relates to dimmer glasses and especially to improvements in the type of glasses shown in my issued Patent No. 1,545,978 of July 14, 1925, entitled "Dimmer glasses".

The glasses shown in the patent referred to briefly described, consist of a nose piece, a pair of spectacle frames, one on each side of the nose piece, and a dimmer member in each spectacle frame and covering the upper left hand quadrant of the total area of each frame.

Actual experience has proven that dimmer glasses so constructed serve the purpose desired, to wit, that of dimming out glaring headlights when driving along highways or the like, but they do not afford the field of vision required when crossing road intersections, as the dimming members are so disposed that they cover the left hand side of the road intersection and will therefore render an automobile approaching from that side practically invisible, and are hence a source of more or less danger.

The object of the present invention is to overcome this objection, to generally improve and simplify the construction and operation of dimmer glasses and particularly, to provide a mounting for the dimming members which leaves a clear and unobstructed field of vision both to the right and left of the dimming members up to and beyond the approaching glaring lights, and the full roadway in front of them. One form which the glasses may assume is exemplified in the accompanying drawings, in which:

Figure 1 is a perspective view of the glasses.

Figure 2 is a front view of the upper cross bar.

Figure 3 is an edge view of the glasses.

Referring to the drawings in detail and particularly to Fig. 1, A indicates a nose piece which in this instance is extended to form a pair of semi-circular shaped lower arms or rim members 2 and 3. The outer ends of the arms are provided with vertical extensions 4 and 5 which are longitudinally slotted as at 6 and the outer ends are also provided with forked bearing members 7 to which the bows or ear pieces 8 are pivotally attached. The nose piece is also provided with a vertical extension such as shown at 9 and this is longitudinally slotted as at 10. Extending crosswise of the upright members 4, 5 and 9 is a cross bar 11. This cross bar is best illustrated in Fig. 2 and is provided with three right angular extensions as indicated at 12, 13 and 14. The extension 12 aligns with the upright member 4 and the extension 14 with the upright 5, and the extension 13 with the central upright 9. The cross bar is vertically adjustable with relation to the nose piece and the semi-circular shaped arms 2 and 3 and this is accomplished by passing clamping screws 16 through the right angular extensions and the respective slotted uprights 4, 5 and 9. The clamping screws by being passed through the slotted uprights permit vertical adjustment and securing of the cross bar at any height desired. The cross bar serves the function of supporting a pair of dimming members generally indicated at 20 and 21. These are constructed of colored glass or like semi-transparent medium and they are secured to rectangular shaped plates or bars 22 and 23. These bars are longitudinally slotted as at 24 and clamping screws 25 are employed to secure the bars 22 with relation to the main cross bar 11. The clamping screws pass through the slots 24 and therefore permit lateral adjustment of the dimming members with relation to the nose piece. In other words, vertical and lateral adjustment of the dimming members is permitted with relation to the eyes of the wearer, this being of considerable importance as the eyes on some individuals are closely set, while they are wider apart on others. Similarly the nose on different individuals assumes a more or less elevated position with relation to the eyes. Hence the necessity of vertical adjustment of the cross bar and the lateral adjustment of the dimmer members thereon.

In actual operation, it will be noted that a spectacle frame has been provided which is supported with relation to a wearer by means of the nose piece A and the bows 8. It will further be noted that the cross bar 11 together with the lower arms 2 and 3 form a pair of spectacle frames, the arms 2 and 3, the lower half thereof, and the cross bar 11 the upper half. A pair of clear and substantially unobstructed openings are thus formed through which the wearer looks when driving, the only area covered being that portion which is taken up by the dimming members 20 and 21. These are fairly small and are substantially rectangular in shape and they are so adjusted that they are not thrown into the line of vision except when the head is tilted in a forward direction. They are only required when blinding headlights are approached and are then interposed between the glaring headlight and the eyes of the wearer by tilting the head in a forward direction. The headlights are thus covered and dimmed out, but the wearer otherwise has a clear and unobstructed field of vision on both sides of the approaching headlights and the roadway in front thereof, this being of particular importance, particularly when driving within city limits or the like, where numerous street intersections are encountered as it is then essential to have a clear field of vision covering both sides of a street intersection and the intervening street section. In actual practice, the dimming members are so adjusted that they assume a substantially central position with relation to the semi-circular shaped arm members 2 and 3. It is preferable however to adjust them slightly to the left of such a central position as practically all vehicles approach from the left hand side. In other words, practical experience has shown, as most approaching vehicles pass on the left hand side, it is the most convenient to have the dimming members so positioned that they will cover such approaching headlights by merely tilting the head in a forward direction. If glasses of this character are used in Canada or other countries where vehicles pass on the right, they would be moved slightly to the right hand side of a central position. The main feature however is to provide a clear field of vision on both sides of the dimming medium so that vehicles approaching either from the right or the left can be clearly seen.

Having thus described my invention, what I claim is:

1. Dimmer glasses of the character described, comprising a nose piece, said nose piece being extended to form a pair of substantially semi-circular shaped arms, a cross bar supported by said arms, and a pair of dimmer members carried by the cross bar and substantially centrally disposed with relation to the semi-circular shaped arms, and means permitting vertical adjustment of the cross bar with relation to the nose piece and the semi-circular shaped arms, and means permitting lateral adjustment of the dimmer members with relation to the cross bar.

2. Dimmer glasses of the character described, comprising a nose piece, said nose piece being extended to form a pair of substantially semi-circular shaped arms, a cross bar supported by said arms, and a pair of dimmer members carried by the cross bar and substantially centrally disposed with relation to the semi-circular shaped arms, and means permitting vertical and lateral adjustment of the dimmer members with relation to the nose piece.

3. Dimmer glasses of the character described comprising a nose piece, said nose piece being extended to form a pair of substantially semi-circular shaped arms, a slotted upright member on the outer end of each arm, a slotted upright member on the nose piece, a cross bar supported by said slotted uprights and vertically adjustable therein and a pair of dimmer members carried by the cross bar and disposed substantially centrally of the semi-circular shaped arms.

4. Dimmer glasses of the character described, comprising a pair of rims, means for disposing and supporting the rims in front of the eyes of a wearer, a dimmer member secured to the upper portion of each rim and disposed substantially centrally thereof, said dimmer members being disposed substantially in the same plane as the rim, and means permitting independent vertical and lateral adjustment of each dimmer member with relation to the supporting rim.

5. Dimmer glasses of the character described comprising a nose piece, a vertically adjustable cross-bar carried by said nose piece, a pair of dimmer members carried by the cross bar, one on each side of the nose piece, and means whereby the dimmer members are longitudinally adjustable on the cross bar to and away from the nose piece.

6. Dimmer glasses of the character described comprising a nose piece, a cross-bar carried by said nose piece, means permitting vertical adjustment of said cross-bar, a dimmer member carried by said cross-bar on each side of said nose piece, and means to permit independent lateral adjustment of each dimmer member.

JARROT L. ROLLINS.